Patented Sept. 15, 1936

2,054,746

UNITED STATES PATENT OFFICE 2,054,746

ETHEREAL CELLULOSE DERIVATIVES AND PROCESS OF MAKING THE SAME

Charles Gränacher, Basel, Switzerland, assignor to the firm of Society of Chemical Industry in Basle, Basel, Switzerland No Drawing. Application January 6, 1931, Serial No. 507,038. In Switzerland January 11, 1930

5 Claims. (Cl. 260—152)

This invention relates to the production of new ethereal cellulose derivatives, and comprises the process of making these derivatives as well as the new derivatives themselves.

According to the invention new ethereal cellulose derivatives are produced by treating, in a first stage, compounds which belong to the cellulose group and contain at least one free hydroxyl group in the $C_6H_{10}O_5$ complex, with such alkylene oxides which contain mobile halogen atoms. By this reaction the cellulose compound is converted into a halogen-hydroxyalkylether, the oxide ring being split; it is preferably accelerated by the presence of a catalyst, for example sulfuric acid or boric acid or the corresponding hydroxyalkyl ester, which esters are immediately formed if the said acids come into contact with alkylene oxides.

The new products are essentially distinguished from the parent materials by their behaviour. Above all, thanks to the presence of a mobile halogen atom, they are capable of being converted into new cellulose derivatives containing nitrogen by treatment with such bases containing nitrogen which may combine additively with halogenalkyls. This conversion into products containing nitrogen is the second stage of the present process. The said new derivatives possess besides an almost generally increased affinity for substantive dyestuffs also an excellent affinity for acid dyestuffs. In both cases the dyeings obtained are characterized by their properties of fastness.

The present process or its stages may be applied not only to structures such as cotton or cellulose threads, but also to dissolved cellulose derivatives. One may also start from raw cotton, linters or cellulose of other origin, such as sulfite cellulose. One may further start from partly acylated cellulose, such as partly formylated, acetylated, butylated, benzoylated or paratoluene-sulfonated cellulose, or from partly etherified cellulose, such as partly methylated, allylated or benzylated cellulose.

As alkylene oxides containing mobile halogen atoms there may, among others, be mentioned:

1. Epichlorhydrin

2. Epibromhydrin

3. Chlorbutylene oxide

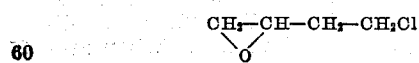

4. Chloramylene oxide

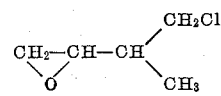

As bases containing nitrogen which may combine additively with halogen alkyls there may quite generally be mentioned ammonia and such aliphatic, cyclic, hydroaromatic and aromatic primary, secondary and tertiary amines which are soluble in dilute mineral acids. A number of such compounds are disclosed in the examples. Others are for instance: dimethylethylamine, ethylbenzylamine, dimethylhexahydroaniline, N-alkylpiperidine, picolines, lutidines, collidines, dialkylanilines and the homologues thereof, alkylpiperazines, etc.

The products of the first stage correspond very probably with the general formula I— 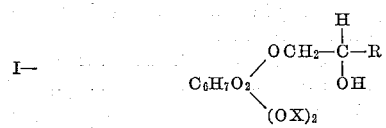

This formula is to be interpreted as follows: R means an alkyl residue containing a halogen atom, and X stands in the place of hydrogen, alkyl or acyl.

The products of the second stage form salts which very probably correspond with the general formula II— 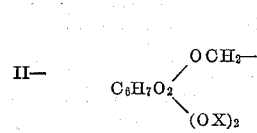 ... halogen In this formula R means an alkylene residue, Y the residue of a base containing nitrogen which may combine additively with a halogen alkyl. Further, in this formula the alkylene residue R and the halogen are bound to the same N-atom of the residue Y. These products, therefore, correspond also with the general formula III— 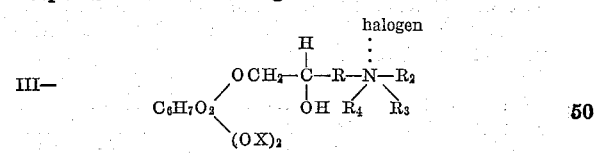

in which $R_2$, $R_3$ and $R_4$, according to the nature of the base containing nitrogen which has been used, stand for hydrogen, alkyl, aralkyl, aryl or also cyclic systems with nitrogen as common ring member, and in which X has the already mentioned signification.

If ammonia is caused to react on the products of the first stage, substances are obtained in which therefore, the substituents $R_2$, $R_3$ and $R_4$ in the Formula III means hydrogen, such as follows from the following formula

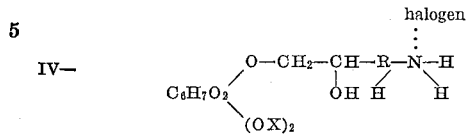

However, if pyridine is for example caused to react on the compounds of the first stage, substances are obtained the chloride of which corresponds with the general formula

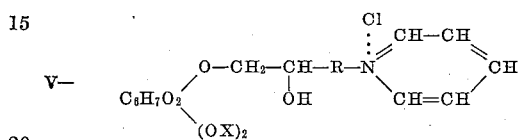

in which, therefore, the substituents $R_2$, $R_3$ and $R_4$ and in the Formula III together with the nitrogen, stand for a common cyclic system.

If, on the other hand, piperidine is used a product is obtained the chlorhydrate of which corresponds with the formula

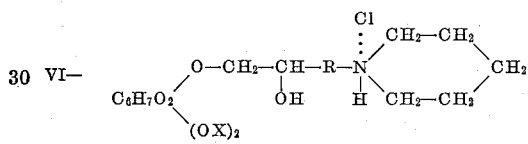

in which, therefore, the substituents $R_2$ and $R_3$ in the Formula III together with the nitrogen stand for a common cyclic system, and the substituent $R_4$ in the Formula III means hydrogen.

From the action of dimethylaniline there results a compound the chloride of which corresponds with the formula

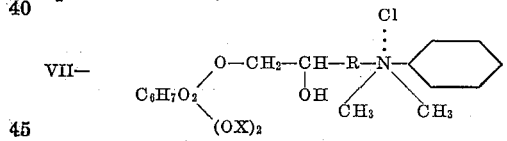

in which, therefore, the substituent $R_2$ in the Formula III stands for an aryl group, and the substituents aryl, $R_3$ and $R_4$ in the Formula III mean alkyl.

Finally, if benzylamine is caused to react on the product of the first stage, there results the chlorhydrate of a compound of the following formula

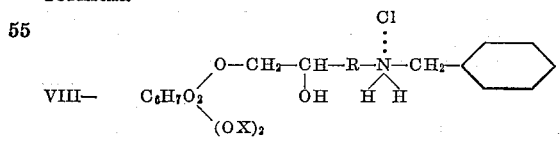

wherein, therefore, the substituent $R_2$ in the Formula III stands for benzyl and the substituents $R_3$ and $R_4$ in the Formula III means hydrogen.

In all the formulae mentioned above X means hydroxyl groups if one starts from the intermediate product of Example 1 hereinafter. However, if one starts from the intermediate products of Examples 2 and 3 hereinafter, one obtains compounds in which X partly stands for OH-groups and partly for OOC.CH₃ groups. In all the formulae mentioned above and below in which X means hydroxyl, X may also be zero.

The following examples illustrate the invention:—

Example 1

100 grams of epichlorhydrin are mixed gradually, while cooling well, with 3 grams of concentrated sulfuric acid. The solution of chlorhydrin-sulfuric acid ester in epichlorhydrin thus obtained is heated with 10 grams of mercerized cotton yarn for 35 hours in a pressure vessel at 130–140° C. When the reaction is finished, the yarn is pressed and carefully washed. It is pure white and now contains a cellulose ether having a mobile halogen atom.

Example 2

In a suitable stirring apparatus 1 kilo of epichlorhydrin is mixed with 25 grams of boric acid and there are added at the boiling point of the epichlorhydrin and in the course of 50 hours, 100 grams of partially acetylated cellulose in the form of yarn. When the reaction is complete the yarn is washed with an organic solvent, such as benzene, then with alcohol and finally with water. The product obtained has the similar properties as those of the product of Example 1.

Example 3

20 grams of partially acetylated yarn are impregnated with an aqueous solution of boric acid of 10 per cent. strength at 60–70° C. and then well pressed and dried. The yarn thus pretreated is exposed in a suitable apparatus for 50 hours to vapor of epichlorhydrin at 120–130° C. The product has the same properties as those of the product obtained as described in Example 2.

Example 4

100 grams of cellulose acetate soluble in acetone, 5 grams of boric acid and 500 grams of epichlorhydrin are heated in a closed vessel to 130–135° C. and maintained at this temperature for 24 hours, while stirring.

The viscous mass of reaction which has formed is extracted in a suitable apparatus with petroleum ether for the purpose of recovering the excess of epichlorhydrin, and the residue is washed with water.

The acetyl-chlorhydrin-ether-cellulose thus obtained as a colorless mass is, like the starting material, soluble in acetone and may be worked up in the usual manner to any desired forms, such as threads, ribbons, films, etc. The structures thus obtained are distinguished by their being suitable for carrying out further chemical reactions thereon due to the halogen atom capable of reaction contained therein.

Example 5

Yarn obtained as described in Example 1, 2 or 3 is heated with 10 times its weight of a concentrated aqueous solution of ammonia in a pressure vessel at 90–100° C. for about 16 hours. After cooling, the yarn is pressed, washed and dried. There is obtained a white fiber, which is characterized by its excellent affinity for acid dyestuffs. In like manner there may be used in this treatment organic amines and when such amine is not soluble in water it is preferable to operate in alcoholic solution. The affinity for acid dyestuffs is particularly pronounced when amines are used, such as mono- and dimethylamine or ethylamine, benzylamine and di-benzylamine, hexahydro-aniline, piperidine, di-ethylethylene-diamine, piperazine or guanidine etc. When aromatic amines are used, such as aniline, the affinity for acid dyestuffs is less pronounced.

Example 6

The yarn obtained as described in Example 1, 2 or 3 is heated with 10 parts of pyridine for 8 hours on the water-bath. The pyridine is then expressed and the yarn is washed. The product thus obtained is particularly strongly dyed by acid dyestuffs. A similar result is obtained by use of other tertiary bases, such as trimethylamine.

Example 7

Cotton yarn which has been pretreated as described in Example 1, 2 or 3 is handled in a solution of 20 grams of casein in 400 cc. of water and 8 grams of soda ash for 24 hours at 60–80° C. The bright colored yarn is then well washed; it has a good affinity for acid dyestuffs. Similar results can be obtained by using egg albumin or gelatine.

In all these examples the stoicheiometrical proportions, the concentrations, the solvents, temperatures, quantities of catalysts used, etc., may of course be varied within wide limits.

Example 8

100 grams of acetyl-chlorhydrin-ether-cellulose in the form of threads are heated in a solution of 2 per cent. strength containing trimethylamine and toluene for 16–20 hours at 60–70° C. The artificial silk thus obtained is particularly characterized by a good affinity for acid wool dyestuffs, as well as for substantive cotton dyestuffs.

Example 9

Yarn obtained as described in the above examples is dyed, in the manner usual for wool and cotton, with an acid wool dyestuff, there being added acetic acid or sulfuric acid, or with a substantive dyestuff in a neutral or, if necessary, weakly alkaline bath. According to the selection of the dyestuffs there are obtained various tints, which are distinguished by their intensity, strength and fastness. Dyestuffs of various classes come into question in this case, for instance Kiton dyes, Kiton fast dyes, Lanasol dyes, Neolan dyes, Cloth fast dyes, Fullacid dyes, Benzyl dyes, Alizarine dyes, further Direct dyes, Direct fast dyes, Rosanthrene dyes, Chlorantine dyes, Chlorantine fast dyes, etc.

What I claim is:—

1. The ethereal cellulose derivatives forming salts of the general formula

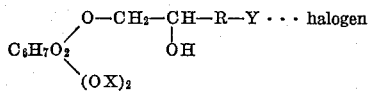

wherein R means an alkylene residue, Y the residue of a tertiary heterocyclic amine of which three nitrogen valences are cyclically bound, wherein further the alkylene residue R and the halogen are bound to the same nitrogen atom of the residue Y, and wherein X stands for hydrogen, alkyl or acyl, which products form colorless to light colored substances having affinity for acid dyestuffs.

2. The ethereal cellulose derivatives forming salts of the general formula

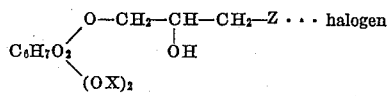

wherein Z means the residue of a tertiary heterocyclic amine of which three nitrogen valences are cyclically bound, wherein further the methylene residue and the halogen are bound to the same nitrogen atom of the residue Z, and wherein X stands for hydrogen, alkyl or acyl, which products form colorless to light colored substances having affinity for acid dyestuffs.

3. The ethereal cellulose derivatives forming salts of the general formula

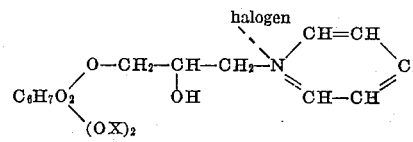

wherein X stands for hydrogen, alkyl or acyl, which products form colorless to light colored substances having affinity for acid dyestuffs.

4. Process for the manufacture of ethereal derivatives of cellulose comprising reacting a tertiary amine with a compound of the general formula

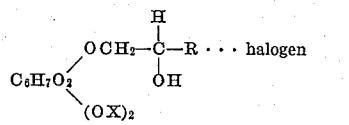

wherein R represents an alkylene residue and X represents a member of the group consisting of hydrogen, alkyl and acyl.

5. Process for the manufacture of ethereal derivatives of cellulose comprising reacting a tertiary heterocyclic amine with a compound of the general formula

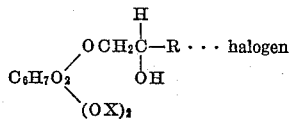

wherein R represents an alkylene residue and X represents a member of the group consisting of hydrogen, alkyl and acyl.

CHARLES GRÄNACHER.